United States Patent [19]

Steigerwald et al.

[11] 4,292,578
[45] Sep. 29, 1981

[54] COMBINATION FIELD CHOPPER AND BATTERY CHARGER

[75] Inventors: Robert L. Steigerwald, Scotia, N.Y.; Keith E. Crouch, Pittsfield, Mass.; James W. A. Wilson, Scotia, N.Y.

[73] Assignee: The United States of America as represented by the United States Department of Energy, Washingon, D.C.

[21] Appl. No.: 65,772

[22] Filed: Aug. 13, 1979

[51] Int. Cl.³ .......................... H02J 7/06; H02J 7/34
[52] U.S. Cl. .................................. 320/9; 320/DIG. 1; 318/139
[58] Field of Search ................. 318/139; 320/DIG. 1, 320/2, 9, 10

[56] References Cited
U.S. PATENT DOCUMENTS

| | | | |
|---|---|---|---|
| 3,417,307 | 12/1968 | Kosa et al. | 320/9 |
| 3,808,481 | 4/1974 | Rippel | 318/139 |
| 3,970,912 | 7/1976 | Hoffman | 320/2 |
| 4,008,423 | 2/1977 | Christianson et al. | 318/139 |
| 4,084,119 | 4/1978 | Kato et al. | 318/139 X |
| 4,091,319 | 5/1978 | Nguyen | 320/9 |

OTHER PUBLICATIONS

General Electric Co. Report No. SRD-78-073 (pp. 3.2-19 through 3.2-23) submitted to Dept. of Energy in 7/78.

*Primary Examiner*—J. V. Truhe
*Assistant Examiner*—Richard M. Moose
*Attorney, Agent, or Firm*—Clifton E. Clouse; Roger S. Gaither; James E. Denny

[57] ABSTRACT

A power transistor used in a chopper circuit to control field excitation of a vehicle motor when in a power mode is also used to control charging current from an a-c to d-c rectifier to the vehicle battery when in a battery charging mode. Two isolating diodes and a small high frequency filter inductor are the only elements required in the chopper circuit to reconfigure the circuit for power or charging modes of operation.

10 Claims, 2 Drawing Figures

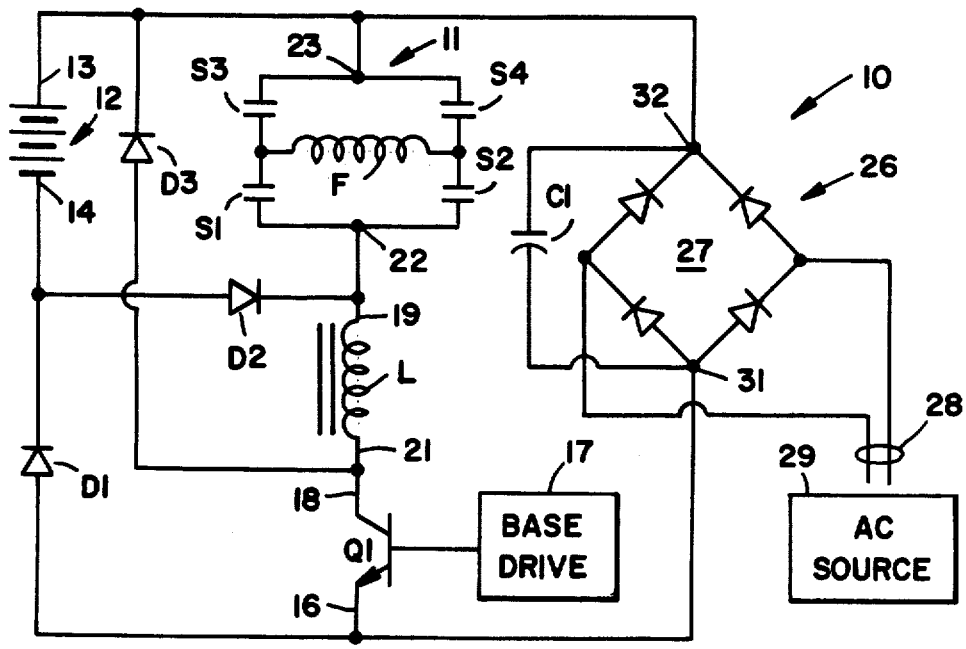
FIG_1
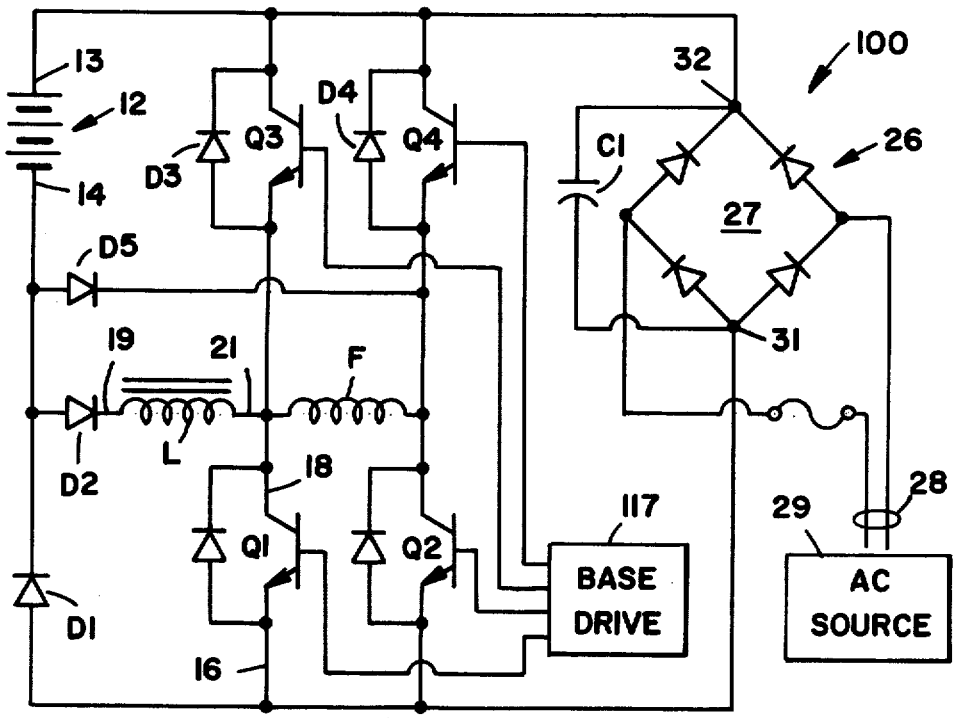
FIG_2

COMBINATION FIELD CHOPPER AND BATTERY CHARGER

The invention described herein arose under, or in the course of, Contract No. EY-76-C-03-1294 (also, later designated as Contract No. DE-AC03-79CS51294) between the United States Department of Energy and The General Electric Company.

BACKGROUND OF THE INVENTION

This invention relates to systems for recharging batteries used for vehicle propulsion.

Although battery driven vehicles have many obvious advantages, they have a severe drawback in that the energy available for propulsion is limited to the amount of energy which can be stored in the batteries. As a consequence, batteries with as large a capacity as possible are used, with battery weight serving as a limitation to the maximum size of the battery which can be carried by the vehicle. Typically, a 108 volt, 200 ampere-hours battery may be used for such purposes.

Because of the constraints imposed by battery size, the batteries must be frequently recharged, and it is to the battery charging problems that the present invention is addressed.

It is desirable to carry the battery charging equipment with the vehicle so that it can be plugged into any conventional a-c power source (and preferably regardless of whether such source be 120 or 240 volts) rather than being restricted to locations having battery chargers thereat.

Since it is to be carried with the vehicle the battery charging equipment should have a low weight and occupy a low volume of space. This poses significant problems because the onboard equipment must be capable of handling and controlling high currents so that the battery may be charged in a reasonably short period to time. Such equipment must also include components to enable the motor control circuits to be changed from a power mode, wherein the battery is connected to drive the motor, to a charging mode wherein the battery is connected to the charger. Further, since an onboard charging apparatus would be needed for each vehicle, it should be inexpensive and utilize as much of the power mode components as possible for the control of the battery charging function.

Prior art attempts have made some dual use of onboard electronics for power and charging modes but have accomplished their results by use of a relatively large number of mechanical power contactors to reconfigure the power circuits from power mode to charging mode. An example of such an attempt is that disclosed in U.S. Pat. No. 4,008,423, issued to C. C. Christianson et.al. on Feb. 15, 1977. Since mechanical contactors are relatively bulky, heavy and expensive, this approach provides but a limited solution to the problem.

It is an object of the present invention to provide a battery charging circuit for use with a battery driven motor which utilizes the power mode components for control of battery charging current and which reconfigures the power circuits from power mode to charging mode by use of inexpensive and lightweight components.

it is a further object of the present invention to provide a battery charging circuit for use with a battery driven motor wherein the battery is connectable to the motor for normal power mode operation of the motor or connectable to a battery charger for normal charging of the battery and wherein damage to the system will not occur if the motor is connected to the battery during charging of the battery.

SUMMARY OF THE INVENTION

In one aspect of the invention, a transistorized chopper for power mode operation of a motor field is also used for controlling battery charging current with isolation diodes being used to reconfigure the power mode and charging mode circuits so that no additional electromechanical contactors are required.

A further aspect of the invention is that two diodes are used, the first diode establishing a first power-current, flow path from the battery, through the field coil, through the electronic control switch (normally a power transistor which is turned on and off at a controlled rate) and through the first diode back to the battery. The second diode establishes a second, charging-current, flow path from an a-c to d-c rectifier unit through the battery, the second diode and the electronic control switch back to the rectifier unit. The diodes are arranged so that the first diode only conducts during the power mode and the second diode only conducts during the charging mode, so that the direction of current flow through the electronic switch is the same in both modes and the direction of current flow through the battery is opposite for the power and charging modes.

Other aspects of the invention will be apparent in the course of the following detailed description.

BRIEF DESCRIPTION OF THE DRAWINGS

In the drawings, forming a part of this application and in which like parts are designated by like reference numerals and letters throughout the same, FIG. 1 illustrates a combination field chopper and battery charger circuit in accordance with the invention and in which the power circuit utilizes electromechanical contactors for connection of the field to the battery.

FIG. 2 illustrates a combination field chopper and battery charger circuit in accordance with the invention and in which the power circuit utilizes power transistors for connection of the field to the battery.

DESCRIPTION OF THE PREFERRED EMBODIMENTS

FIG. 1 Embodiment

Referring now to the drawings, FIG. 1 illustrates a combination field chopper and battery charger 10 for use with a field unit 11 with a field F (of a motor, not shown) and electromechanical field switches, or contactors, S1,S2,S3 and S4 associated therewith. As is well known in the art, switches S1 and S4 function together in series with the field F so that when closed (with switches S2 and S3 being open) power current from battery 12 may flow in one direction through the field to produce one direction of rotation of the motor. Likewise, when switches S2 and S3 are closed (with switches S1 and S4 open) battery power current will flow in the opposite direction through the field F to cause opposite rotation of the motor.

Battery 12 has positive and negative terminals 13 and 14, one of which (in this case, terminal 14) is connected through a first diode D1 to one side 16 of uni-directional electronic switch Q1. Preferably, electronic switch Q1 is a power transistor having its base connected to a base drive unit 17 which will turn the transistor on and off at a desired frequency and at a desired ratio of on-time to off-time to control the current flow therethrough.

A second diode D2 is connected between the same battery terminal 14 and the other side 18 of transistor Q1 and has an inductor L in series therewith, inductor L having one side 19 connected directly to diode D2 and the other side 21 thereof connected directly to the other side 18 of transistor Q1. As will be noted, the polarity of diodes D1 and D2 relative to battery 12 are opposite to each other, with the anode of one and the cathode of the other being connected to battery terminal 14.

The side 19 of inductor L is also connected to one side 22 of field unit 11 while the other side 23 of the field unit is connected to the other terminal 13 of battery 12.

A third diode D3, generally referred to as a coasting, or flyback diode, is connected from the other side 18 of transistor Q1 to the other terminal 13 of battery 12 to allow flow of inductive current therethrough when transistor Q1 is turned off.

A rectifier unit 26 is provided, which includes a conventional full wave bridge rectifier 27 having an a-c input 28 adapted to be connected to an a-c source 29, such as a house line, and d-c output terminals 31 and 32. As illustrated herein one of the output terminals 31 is negative and the other terminal 32 is positive when the input 28 is connected to the a-c source 29. A relatively small high frequency capacitor C1 is connected across the output terminals 31 and 32 to filter the d-c output of the bridge rectifier supply the high frequency current components demanded for operation of the chopper circuit described above. Output terminals 31 is connected to terminal 16 of transistor Q1 while output terminal 32 (shown herein as of position polarity) is connected to the same polarity terminal 13 of battery 12.

Operation of the FIG. 1 Embodiment

In normal power operation of the system, i.e. when disconnected from the a-c source and operating under battery power, field contactors S1 and S4 (or S2 and S3) will be closed to complete a first current path from battery 12, through field coil F, inductance L, transistor Q1, and first diode D1 back to battery 12. In a well known manner the base drive unit 17 will turn transistor Q1 on and off at a desired frequency, e.g. from 10 to 20 kHz, and at a desired ratio of on-time to off-time, so that the battery power to the field, and the speed of the vehicle can be smoothly varied.

When transistor Q1 is turned off on each cycle of its operation, the inductive voltage generated by the field coil F and inductor L will forward bias diode D3, causing it to conduct and circulate the inductive current.

During the power mode of operation, the potential at side 22 of the field unit 11 is never lower than the potential at battery terminal 14 so that the second diode D2 will always be back-biased and non-conductive in the power mode.

The charging mode is initiated by opening all of the field switches S1-S4 and by plugging the a-c inlet 28 into the a-c source 29. The rectified d-c voltage at the output terminals 31,32 of the rectifier unit 26 is higher than battery voltage and the second diode D2 will be forward biased into conduction, thus completing a second current path comprising the rectifier unit 26, the battery, the second diode D2 inductor L and transistor Q1. With the battery now acting as the load on the rectifier output, the direction of current flow through the battery will be opposite to that in the power mode, so that the battery will be charged. The direction of current flow through transistor Q1 will be the same as before and the base drive unit 17 will control the conduction of the transistor Q1 to regulate the rate at which the battery is charged.

Inductor L is a small high frequency inductor which provides the necessary energy storage for the battery charging mode, and the flyback path (when transistor Q1 is turned off on each cycle of its operation) is now formed by inductor L, the third diode D3, the battery and the second diode D2.

During the charging mode, the potential at battery terminal 14 is always higher than the potential at the side 16 of transistor Q1 (and the negative terminal 31 of the rectifier unit connected thereto) so that the first diode D1 is back biased and non-conductive.

After the battery is partially or fully charged, the a-c inlet 28 can be unplugged and the system is ready for immediate power operation as previously described.

The vehicle operator may accidentally or intentionally cause one set of the field switches S1-S4 or S2-S3 to close, thus connecting the field F into the circuit during charging, which will put the field F in parallel with the battery 12 so that the field coil is powered by the rectifier unit 26. The typical base drive unit 17 will operate in response to closure of a set of field switches, operator-demanded speed (as for example, an accelerator pedal) and the magnitude of current flow through the field F so that transistor Q1 will allow only as much current flow therethrough as is necessary to produce the demanded speed of the motor. Because of this control of field current, a connection of the field F into the circuit while in charging mode will not damage the system.

FIG. 2 Embodiment

The embodiment 100 of the invention illustrated in FIG. 2 differs primarily in that the power circuit utilizes power transistors Q3 and Q4 to function as switches in series with the field F, in place of the previously described mechanical field contactors, for connecting the field F into the circuit for current flow therethrough in a desired direction and that two power transistors, Q1 and Q2 are used to control the amount of field current flow.

In power operation, the base drive unit 117 will bias either transistor Q3 or Q4 into conduction while holding the other from conducting, dpending on the desired direction of the motor. Let use assume that Q4 has been turned on, connecting the right end of the field F to terminal 13 of the battery, and Q3 is off. The base drive unit 117 will now turn transistor Q1 on and off at the desired frequency and at a desired ratio of on-time to off-time, as in the FIG. 1 embodiment. (Transistor Q2 will be held in the non-conductive state by the base drive unit 117 during this time.) As before, a first power current flow path is thus established by the battery 12, the field unit of the series connected transistor Q3 and field F, transistor Q1 and the first diode D3 is established for discharge of the inductive energy of the field F when transistor Q1 is turned off each time.

If it is desired to operate the motor in the opposite direction, the base drive unit 117 will respond to a commond signal and turn transistors Q1 and Q4 off while turning transistors Q2 and Q3 on, so that the field F is reversely connected. Current flow through the field is then regulated by control of transistor Q2. The flyback path is now through diode D4 which is connected across the turned-off transistor Q4.

Regardless of the direction of current flow through the field F, the potential at side 18 of transistor Q1 will never be lower in the power mode than the potential at battery terminal 14 so that the second diode D2 will always be back biased and nonconductive in the power mode.

In the battery charging mode, the base drive unit 117 will turn transistors Q2, Q3 and Q4 off and regulate the conduction of transistor Q1 as in the FIG. 1 embodiment. The a-c inlet 28 is plugged into the a-c source 29 to provide a rectified d-c output at terminals 31 and 32 of the rectifier unit 14. As before a battery charging current path is established by the rectifier unit 14, battery 12, second diode D2, inductor L and transistor Q1, so that the battery is charged as before. In this embodiment, inductor L is only connected in the charging flow path rather than being in both the charging and power flow paths as in the FIG. 1 embodiment.

Again, as in FIG. 1, the first diode D1 will be back-biased out of conduction during the charging mode and a flyback path for inductor L will be provided through the third diode D3.

Also as in FIG. 1, if the field F is connected into the circuit by the base driver unit 117 when the system is plugged into the a-c source 29, the field F will be powered by the rectifier unit 26 but the field current will be limited by the base control of transistors Q1 or Q2 so that no damage to the system will result.

The embodiment of FIG. 2 is also advantageous in that it will allow the field current to be rapidly driven to zero by turning off all transistors Q1 through Q4. For example, suppose that transistors Q2 and Q3 have been turned on so that current flow through the field F is to the right in FIG. 2. If all transistors are now turned off the field current will dissipate through the path formed by diode D4, battery 12, the second diode D2 and inductor L back to the other side of the field coil F. A fifth diode D5 is connected to battery terminal 14 (and poled thereto as is the second diode D2) and the right side of the field F so that if field current had been in the opposite direction, an inductive discharge path will be formed across the field F by the third diode D3, battery 12 and the fifth diode D5 when all transistors are turned off.

The foregoing description of preferred embodiments of the invention has been presented for purposes of illustration and description and is not intended to be exhaustive or to limit the invention to the precise forms disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A combination field chopper and battery charger comprising:
    a battery,
    an electronic switch,
    a field unit having a series connected field coil and field switch,
    a rectifier unit having an a-c input and a d-c output,
    first and second diodes,
    circuit means for connecting said battery, said field unit, said electronic switch and said first diode in series with each other to form a first unidirectional current flow path therethrough and for connecting together said d-c output of said rectifier unit, said battery, said second diode and said electronic switch in series with each other to form a second uni-directional flow path therethrough, with the direction of the first and second flow paths through said electronic switch being the same and with the direction of the first and second flow paths through said battery being opposite to each other.

2. A combination field chopper and battery charger as set forth in claim 1 and further comprising:
    an inductor connected in said second current flow path between one terminal of said battery and a side of said electronic switch,
    a third diode connected between said side of said electronic switch and the other terminal of said battery.

3. A combination field chopper and battery charger as set forth in claim 1,
    wherein both of said first and second diodes are connected to one terminal of said battery and further comprising:
    an inductor connected to a side of said electronic switch and in both of said first and second current flow paths,
    a third diode connected between said side of said electronic switch and the other terminal of said battery.

4. A combination field chopper and battery charger comprising:
    a battery having positive and negative terminals,
    a unidirectional electronic switch,
    a first diode connected between one of said battery terminals and one side of said electronic switch,
    a second diode connected between said one of said battery terminals and the other side of said electronic switch, the polarity of said first and second diodes relative to said battery being opposite to each other,
    a field unit comprising a series connected field coil and field switch, said field unit being connected between said other side of said electronic switch and the other of said battery terminals,
    a rectifier unit having an a-c input and a d-c output, said d-c output having positive and negative terminals one of which is connected to said one side of said electronic switch and the other of which is connected to said other of said battery terminals, said other rectifier output terminal and said other battery terminal both having the same polarity.

5. A combination field chopper and battery charger as set forth in claim 4 and further including:
    an inductor connected in series with said second diode,
    a third diode connected between said other terminal of said battery and a point between said inductor and said other side of said electronic switch.

6. A combination field chopper and battery charger as set forth in claim 4 and further including:
    an inductor having one side thereof connected to said second diode and the other side thereof connected to said other side of said electronic switch,
    a third diode connected to said other terminal of said battery and to said other side of said electronic switch, said third diode being poled to allow current flow therethrough only when current is not flowing through said electronic switch.

7. A combination field chopper and battery charger as set forth in claim 6 wherein said one side of said inductor is also connected to said field unit.

8. A combination field chopper and battery charger as set forth in claim 6 wherein said other side of said electronic switch is connected directly to one side of said field coil and further comprising:
   a fourth diode connected between said one terminal of said battery and the other side of said field coil, said fourth diode having the same polarity relative to said one terminal of said battery as does said second diode.

9. A combination field chopper and battery charger as set forth in claim 8, and further including:
   a second electronic switch having one side connected to said one side of the first-mentioned electronic switch and the other side thereof connected directly to said other side of said field coil.

10. In a chopper circuit having a battery, a power transistor having one side thereof connected to one terminal of said battery, a field unit having series-connected field coil and switch, one side of said field unit being connected to said other side of said power transistor and the other side of said field unit being connected to the other terminal of said battery, a coasting diode connected from between said other side of said power transistor and the other side of said field unit to said other terminal of said battery, and means to regulate the conduction of said power transistor, the improvement comprising:
   an a-c to d-c rectifier unit having output terminals one of which is connected to said one side of said power transistor and the other of which is connected to said other terminal of said battery,
   a first diode interposed in the connection from said one battery terminal to said one side of said power transistor,
   a second diode and an inductor connected in series with each other, one of which is connected to said one battery terminal and the other of which is connected to said coil.

* * * * *